US012392134B2

(12) United States Patent
Collins et al.

(10) Patent No.: US 12,392,134 B2
(45) Date of Patent: Aug. 19, 2025

(54) PRE-MANUFACTURED FLOOR-CEILING PANEL FOR A MULTI-STORY BUILDING HAVING LOAD BEARING WALLS

(71) Applicant: Innovative Building Technologies, LLC, Seattle, WA (US)

(72) Inventors: Arlan E. Collins, Seattle, WA (US); Mark L. Woerman, Seattle, WA (US); Mark D'Amato, Seattle, WA (US); Eric P. Hinckley, Superior, CO (US); Calder Danz, Seattle, WA (US); Christopher J. Allen, Aloha, OR (US); Dale V. Paul, Poulsbo, WA (US)

(73) Assignee: Innovative Building Technologies, LLC, Seattle, WA (US)

( * ) Notice: Subject to any disclaimer, the term of this patent is extended or adjusted under 35 U.S.C. 154(b) by 290 days.

(21) Appl. No.: 18/248,796

(22) PCT Filed: Oct. 21, 2021

(86) PCT No.: PCT/US2021/056076
§ 371 (c)(1),
(2) Date: Apr. 12, 2023

(87) PCT Pub. No.: WO2022/087282
PCT Pub. Date: Apr. 28, 2022

(65) Prior Publication Data

US 2023/0374781 A1 Nov. 23, 2023

Related U.S. Application Data

(60) Provisional application No. 63/178,515, filed on Apr. 22, 2021, provisional application No. 63/104,239, filed on Oct. 22, 2020.

(51) Int. Cl.
*E04B 5/10* (2006.01)
*B66B 11/00* (2006.01)
(Continued)

(52) U.S. Cl.
CPC ............ *E04B 5/04* (2013.01); *B66B 11/0005* (2013.01); *E04B 1/02* (2013.01); *E04B 1/08* (2013.01);
(Continued)

(58) Field of Classification Search
CPC ..... E04B 1/02; E04B 1/08; E04B 1/18; E04B 1/167; E04B 1/2403; E04B 1/3483;
(Continued)

(56) References Cited

U.S. PATENT DOCUMENTS 5,644,871 A * 7/1997 Cohen ........................ E04B 5/04 52/125.4
6,073,401 A * 6/2000 Iri .......................... E04B 1/3483 52/79.9
(Continued)

FOREIGN PATENT DOCUMENTS

DE 20 2014 002 800 U1 5/2014

OTHER PUBLICATIONS

USPTO, Written Opinion for International Patent Application No. PCT/US2021/056076, Jan. 28, 2022, 8 pages.
(Continued)

*Primary Examiner* — Paola Agudelo
(74) *Attorney, Agent, or Firm* — IP Spring

(57) ABSTRACT

Floor-ceiling panels are provided for a building that includes load bearing walls that are able to withstand vertical loads and lateral loads. The building may be a low-rise building or a mid-rise building. The floor-ceiling panels, as well as the load bearing walls, corridor panels, utility walls, and other parts of the building are pre-manufactured off-site and then installed on-site at the site of the building. The floor-ceiling panels are hung from the load bearing walls and are capable
(Continued)

to receive and transfer lateral and vertical loads, as well as providing improved sound proofing and fire rating for the building.

20 Claims, 10 Drawing Sheets

(51) Int. Cl.

| | |
|---|---|
| ***E04B 1/02*** | (2006.01) |
| ***E04B 1/08*** | (2006.01) |
| ***E04B 1/24*** | (2006.01) |
| ***E04B 1/348*** | (2006.01) |
| ***E04B 1/61*** | (2006.01) |
| ***E04B 2/60*** | (2006.01) |
| ***E04B 5/02*** | (2006.01) |
| ***E04B 5/04*** | (2006.01) |
| ***E04B 9/00*** | (2006.01) |
| ***E04B 9/04*** | (2006.01) |

(52) U.S. Cl.

CPC .............. *E04B 1/24* (2013.01); *E04B 1/2403* (2013.01); *E04B 1/3483* (2013.01); *E04B 1/34869* (2013.01); *E04B 1/612* (2013.01); *E04B 1/6125* (2013.01); *E04B 2/60* (2013.01); *E04B 5/10* (2013.01); *E04B 9/008* (2013.01); *E04B 9/04* (2013.01); *E04B 2001/2415* (2013.01); *E04B 2001/2418* (2013.01); *E04B 2001/2451* (2013.01); *E04B 2001/2481* (2013.01); *E04B 2001/6191* (2013.01); *E04B 2001/6195* (2013.01); *E04B 5/02* (2013.01); *E04B 2103/06* (2013.01)

(58) Field of Classification Search

CPC . E04B 1/6125; E04B 5/02; E04B 9/04; E04B 9/10; E04B 9/22

See application file for complete search history.

(56) References Cited

U.S. PATENT DOCUMENTS

| | | | | | |
|---|---|---|---|---|---|
| 6,460,297 | B1 | 10/2002 | Bonds et al. | | |
| 8,234,827 | B1 * | 8/2012 | Schroeder, Sr. | E04B 1/24 | 52/638 |
| 8,276,328 | B2 * | 10/2012 | Pepin | E04C 2/386 | 52/657 |
| 2004/0261349 | A1 * | 12/2004 | Hashimoto | E04B 1/08 | 52/633 |
| 2010/0229472 | A1 * | 9/2010 | Malpas | E04C 2/521 | 52/173.3 |
| 2011/0277405 | A1 | 11/2011 | Bowron | | |
| 2013/0211795 | A1 * | 8/2013 | Vanker | E04B 1/08 | 703/1 |
| 2014/0033631 | A1 * | 2/2014 | Rokk | E04H 9/00 | 52/582.2 |
| 2014/0083046 | A1 * | 3/2014 | Yang | E04B 1/2403 | 52/704 |
| 2015/0308096 | A1 * | 10/2015 | Merhi | E04G 21/14 | 52/745.1 |
| 2016/0040443 | A1 * | 2/2016 | Stephenson | E04H 1/005 | 52/79.5 |
| 2017/0284095 | A1 * | 10/2017 | Collins | E04C 2/322 | |
| 2018/0355601 | A1 * | 12/2018 | Collins | E04B 1/24 | |
| 2019/0010693 | A1 * | 1/2019 | Powers | E04H 15/001 | |
| 2019/0093356 | A1 | 3/2019 | Collins et al. | | |
| 2019/0169844 | A1 * | 6/2019 | Yousefi Darestani | E04B 1/167 | |
| 2019/0323235 | A1 * | 10/2019 | Benson | E04C 3/34 | |
| 2023/0061113 | A1 * | 3/2023 | Keller | E04B 2/56 | |

OTHER PUBLICATIONS

USPTO, International Search Report for International Patent Application No. PCT/US2021/056076, Jan. 28, 2022, 2 pages.

* cited by examiner

PRE-MANUFACTURED FLOOR-CEILING PANEL FOR A MULTI-STORY BUILDING HAVING LOAD BEARING WALLS

CROSS-REFERENCE TO RELATED APPLICATIONS

The present application is the U.S. national phase filing under 35 U.S.C. § 371 of International Patent Application No. PCT/US2021/056076, filed on Oct. 21, 2021, which claims priority under 35 U.S.C. § 119 (e) and/or under PCT Article 8 to U.S. Provisional Patent Application No. 63/104,239, filed on Oct. 22, 2020, and entitled "LOAD BEARING WALLS FOR A BUILDING" and to U.S. Provisional Patent Application No. 63/178,515, filed on Apr. 22, 2021, and entitled "LOW-MID RISE BUILDING HAVING LOAD BEARING WALLS, UTILITY WALLS, AND A CORRIDOR SYSTEM, AND OTHER ACCOMPANYING STRUCTURE, AND METHOD TO CONSTRUCT THE BUILDING." The contents of U.S. Provisional Patent Application Nos. 63/104,239 and 63/178,515 are incorporated herein by reference in their entirety.

The present application is related in subject matter to each of the following co-pending applications, each of which shares a common filing date of Oct. 21, 2021, entitled "MULTI-STORY BUILDING HAVING LOAD BEARING WALLS AND METHOD TO CONSTRUCT THE BUILDING", "MULTI-STORY BUILDING HAVING PODIUM LEVEL STEEL TRANSFER STRUCTURE", "PRE-MANUFACTURED LOAD BEARING WALLS FOR A MULTI-STORY BUILDING", "PRE-MANUFACTURED UTILITY WALL FOR A MULTI-STORY BUILDING HAVING LOAD BEARING WALLS", "PRE-MANUFACTURED FLOOR-CEILING CORRIDOR PANEL FOR A MULTI-STORY BUILDING HAVING LOAD BEARING WALLS", "MULTI-STORY BUILDING HAVING PRE-FABRICATED STAIR AND ELEVATOR MODULES", and "PRE-MANUFACTURED FLOOR-CEILING DRAG ANCHOR FOR A MULTI-STORY BUILDING HAVING LOAD BEARING WALLS", all of which are hereby incorporated by reference herein, in their respective entireties.

BACKGROUND

Conventional construction is typically conducted in the field at the building job site. People in various trades (e.g., carpenters, electricians, and plumbers) measure, cut, and install material as though each unit were one-of-a-kind. Furthermore, activities performed by the trades are arranged in a linear sequence. The result is a time-consuming process that increases the risk of waste, installation imperfections, and cost overruns.

Traditional building construction continues to be more and more expensive and more and more complex. Changing codes, changing environments, and new technology have all made the construction of a building more complex than it was 10 or more years ago. In addition, trade labor availability is being reduced significantly. As more and more craftsmen retire, fewer and fewer younger workers may be choosing the construction industry as a career, leaving the construction industry largely lacking in skilled and able men and women to do the growing amount of construction work.

The construction industry is increasingly using modular construction techniques to improve efficiency. Modular construction techniques may include pre-manufacturing complete volumetric units (e.g., a stackable module) or one or more building components, such as wall panels, floor panels, and/or ceiling panels, offsite (e.g., in a factory or manufacturing facility), delivering the pre-manufactured modules or components to a building construction site, and assembling the pre-manufactured modules or components at the building construction site.

While modular construction techniques provide certain advantages over traditional construction techniques, challenges continue to exist in being able meet housing and other building demands in communities. For example, the construction industry, whether using modular construction techniques or traditional construction techniques, needs to be able to address issues such as reducing construction costs and construction waste, reducing time to build, providing building designs that efficiently use space, and other challenges brought on by increasing demands for affordable housing and other building needs.

SUMMARY

An embodiment provides a pre-manufactured floor-ceiling panel for a multi-story building. The pre-manufactured floor-ceiling panel includes:

- a plurality of parallel metal joists;
- an end member affixed to an end of the joists;
- a first angle having a horizontal section and a vertical section, wherein the horizontal section of the first angle is configured to be placed on top of a plate of a load bearing wall of the building, and wherein the vertical section of the first angle is affixed to the end member;
- a second angle having a horizontal section and a vertical section, wherein the horizontal section of the second angle forms a fastening location for a horizontal member of the load bearing wall, and wherein the vertical section of the second angle is affixed to the vertical section of the first angle,
- wherein the horizontal section of the first angle is formed with first holes for alignment with second holes formed in the plate of the load bearing wall.

Another embodiment provides a multi-story building. The building includes:

- a stair and elevator module at a ground level of the building;
- brace members that are guided into position by the stair and elevator module;
- a steel transfer structure that is linked to the brace members, wherein the steel transfer structure includes vertical columns and horizontal beams;
- pre-manufactured first floor-ceiling panels that are hung from the beams;
- pre-manufactured first load bearing walls positioned on top of the beams;
- pre-manufactured utility walls that are hung from the first load bearing walls;
- corridor panels that are hung from the utility walls; and
- pre-manufactured second floor-ceiling panels that are hung from the first load bearing walls, wherein each of the pre-manufactured second floor-ceiling panels include:
  - a plurality of parallel metal joists;
  - an end member affixed to an end of the joists;
  - a first angle having a horizontal section and a vertical section, wherein the horizontal section of the first angle is configured to be placed on top of a plate of a particular first load bearing wall of the building, and wherein the vertical section of the first angle is affixed to the end member;

a second angle having a horizontal section and a vertical section, wherein the horizontal section of the second angle forms a fastening location for a horizontal member of the particular first load bearing wall, and wherein the vertical section of the second angle is affixed to the vertical section of the first angle, wherein the horizontal section of the first angle is formed with first holes for alignment with second holes formed in the plate of the particular first load bearing wall.

Still another embodiment provides method to manufacture a floor-ceiling panel for a multi-story building that includes load bearing walls. The method includes:

arranging a plurality of metal joists in parallel;

affixing an end member to ends of the joists;

affixing a first angle and a second angle to each other, wherein:

the first angle has a horizontal section and a vertical section, wherein the horizontal section of the first angle is configured to be placed on top of a plate of a load bearing wall of the building, the second angle has a horizontal section and a vertical section, wherein the horizontal section of the second angle forms a fastening location for a horizontal member of the load bearing wall, and the first angle and the second angle are affixed to each other by affixing the vertical section of the second angle to the vertical section of the first angle;

affixing the vertical section of the first angle to the end member;

forming first holes in the horizontal section of a first angle for alignment with second holes formed in the plate of the load bearing wall; and forming at least one cutout in the horizontal section of the first angle to accommodate a spigot attached to the load bearing wall.

DETAILED DESCRIPTION

Figure 1:
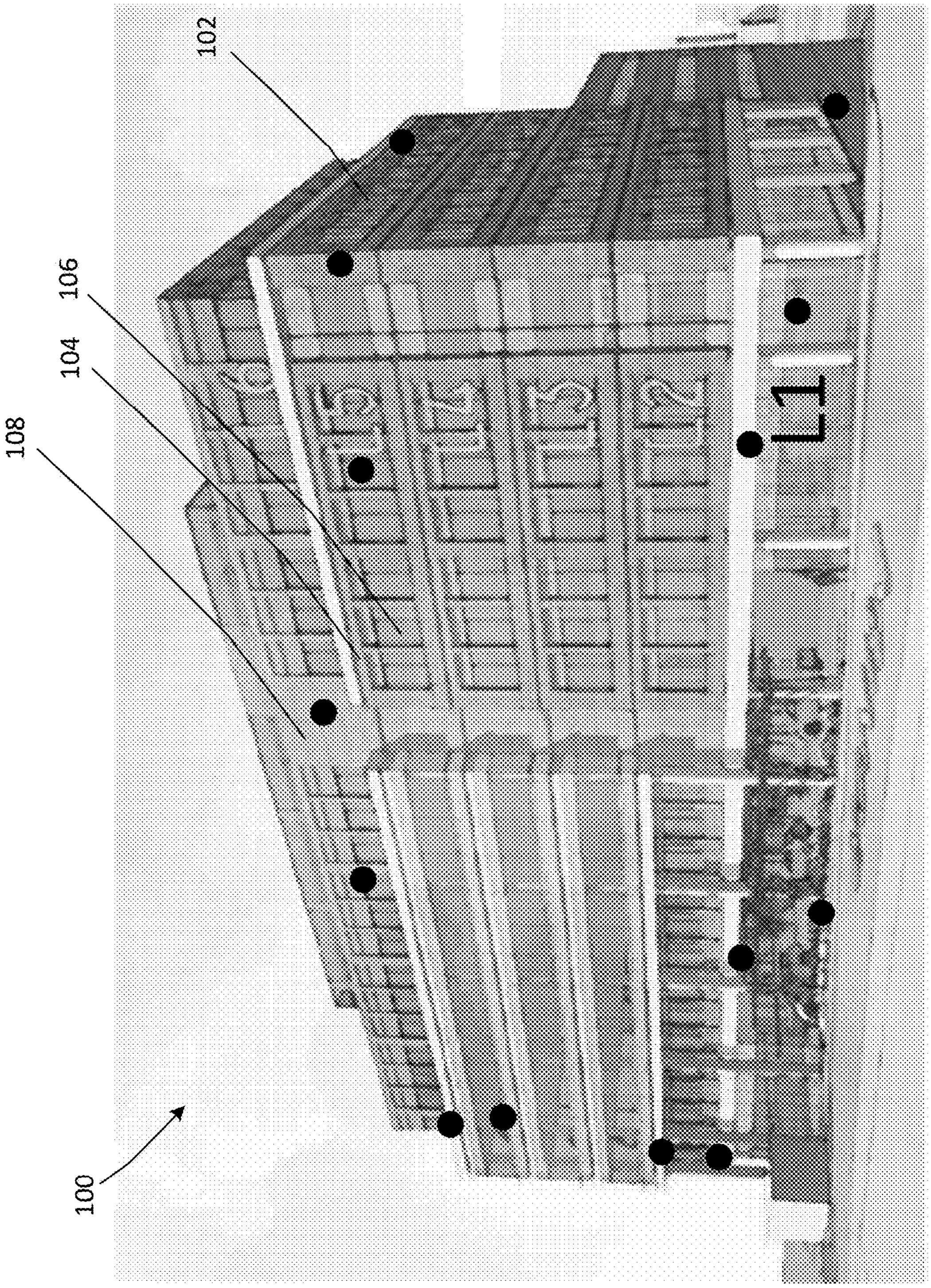
FIG. 1 is an illustration of an example multi-story building that can have pre-manufactured floor-ceiling panels, load bearing walls, and other building parts described herein, in accordance with some implementations.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are contemplated herein.

This disclosure is drawn, inter alia, to methods, systems, products, devices, and/or apparatuses generally related to pre-manufactured floor-ceiling panels that may be used in multi-story buildings having load bearing walls and other building parts (e.g., stair and elevator modules, steel transfer structures, corridor panels, etc.), such as a low-rise or mid-rise building. The floor-ceiling panels are structural in that they are able to absorb and/or transfer lateral and/or vertical loads.

Traditionally, buildings are constructed using a steel structural frame that is designed to resist vertical and lateral loads. Thus, the structural frame can be thought of as a skeletal structure of a multi-story building, wherein the structural frame provides structural support for the building by absorbing vertical loads due to the weight of multiple stories and lateral loads such as due to wind or earthquakes, as well as providing the framing for various walls, floors, ceilings, and other components that can be affixed to the structural frame during the course of constructing the building. However, manufacturing and assembling such a traditional and extensive structural frame can be time consuming and costly in terms of labor and material. For instance, an affordable housing crisis or other community needs may dictate that buildings with good structural integrity be built quickly and economically.

Therefore, various embodiments disclosed herein pertain to construction of a building using load bearing walls and other building parts such that the reliance upon a traditional structural frame can be reduced or eliminated, while at the same time enabling the building to meet lateral and vertical loading requirements. The load bearing walls can be pre-manufactured demising walls, end walls, or other vertical walls (including possibly utility walls), at least some of which are constructed and arranged so as to provide the structural support for the building in a manner that is sufficient to enable the building to handle vertical and lateral loads. The other building parts, such as the pre-manufactured floor-ceiling panels and corridor panels and their accompanying components, in combination with the load bearing walls and coupling linkages between them, also enhance the structural integrity for the building (e.g., for handling or transferring loads), improve acoustical performance, and increase fire safety.

The building may be a multi-story low-rise building or a multi-story mid-rise building in some embodiments. Each story of the building can include a single unit or multiple units. For instance, a particular unit may be living space, office space, retail space, storage space, or other human-occupied space or otherwise usable space in the building. In the context of living space, as an example, each story of the building may include multiple units to respectively accommodate multiple tenants.

The use of the pre-manufactured load bearing walls and other pre-manufactured parts enables the building to be constructed with a shorter time to build and at a lower cost (relative to a building that is constructed using a traditional structural frame), and without sacrificing the structural integrity of the building. Moreover, the floor-ceiling panels of the building may be made thinner relative to conventional floor-ceiling panels, thereby enabling the building to have more stories per vertical foot compared to a traditional building. Thus, the building is able to provide more usable space (e.g., living space) as opposed to a traditional building that occupies the same footprint. In other cases, the thinner floor-ceiling panels provide more space between the floor and ceiling of each unit, which may be desirable for some occupants that prefer living spaces with "high ceilings."

In some embodiments, the material composition of an entire module, as well as the wall, ceiling, and floor panels, may include steel. In some embodiments, the material composition may include aluminum. In still other embodiments, the wall, ceiling, and floor panels may be made from a variety of building suitable materials ranging from metals and/or metal alloys, composites, to wood and wood polymer composites (WPC), wood based products (lignin), other organic building materials (bamboo) to organic polymers (plastics), to hybrid materials, earthen materials such as ceramics, glass mat, gypsum, fiber cement, magnesium oxide, or any other suitable materials or combinations thereof. In some embodiments, cement, grout, or other pourable or moldable building materials may also be used. In other embodiments, any combination of suitable building material may be combined by using one building material for some elements of the entire module, as well as the wall, ceiling and floor panels, and other building materials for other elements of the entire module, as well as the wall, ceiling, and floor panels. Selection of any material may be made from a reference of material options (such as those provided for in the International Building Code), or selected based on the knowledge of those of ordinary skill in the art when determining load bearing requirements for the structures to be built. Larger and/or taller structures may have greater physical strength requirements than smaller and/or shorter buildings. Adjustments in building materials to accommodate size of structure, load, and environmental stresses can determine optimal economical choices of building materials used for components in an entire module, as well as the wall, ceiling, and floor panels described herein. Availability of various building materials in different parts of the world may also affect selection of materials for building the system described herein. Adoption of the International Building Code or similar code may also affect choice of materials.

Any reference herein to "metal" includes any construction grade metals or metal alloys as may be suitable (such a steel) for fabrication and/or construction of the entire module, as well as wall, ceiling, and floor panels, and/or other components thereof described herein. Any reference to "wood" includes wood, wood laminated products, wood pressed products, wood polymer composites (WPCs), bamboo or bamboo related products, lignin products and any plant derived product, whether chemically treated, refined, processed or simply harvested from a plant. Any reference herein to "concrete" or "grout" includes any construction grade curable composite that includes cement, water, and a granular aggregate. Granular aggregates may include sand, gravel, polymers, ash and/or other minerals.

FIG. 1 is an illustration of an example multi-story building 100 that can have pre-manufactured floor-ceiling panels, load bearing walls, and other building parts (e.g., pre-manufactured corridor panels, utility walls, window walls, and other type of walls, etc.), in accordance with some implementations. It is noted that the building 100 of FIG. 1 is being shown and described herein as an example for purposes of providing context for the various embodiments in this disclosure. The various embodiments may be provided for buildings that have a different number of stories, footprint, size, shape, configuration, appearance, etc. than those shown for the building 100.

The building 100 may be a multi-story building with one or more units (e.g., living, office, or other spaces) in each story. In the example of FIG. 1, the building 100 has six stories/levels/floors, labeled as levels L1-L6. Also as shown in FIG. 1, the building 100 has a generally rectangular footprint, although the various embodiments disclosed herein may be provided for buildings having footprints of some other shape/configuration. Moreover, each story may not necessarily have the same shape/configuration as the other stories. For instance in FIG. 1, level L6 of the building 100 has a smaller rectangular footprint relative to levels L1-L5.

The ground floor level L1 may contain living spaces, office spaces, retail spaces, storage spaces, common areas (such as a lobby), etc. or combination thereof. Levels L2-L6 may also contain living spaces, office spaces, retail spaces, storage spaces parking, storage, common areas, etc. or combination thereof. Such spaces may be defined by discrete units, separated from each other and from corridors or common areas by interior demising walls and utility walls (not shown in FIG. 1). An individual unit in turn may be made up of multiple rooms that may be defined by load bearing or non-load bearing walls. For example, a single unit on any given level may be occupied by a tenant, and may include a kitchen, living room, bathrooms, bedrooms, etc. separated by walls, such as demising walls or utility walls. There may be multiple units (e.g., for multiple respective tenants) on each story, or only a single unit (e.g., for a single tenant) on a single story.

Each end of the building 100 includes an end wall 102. One or more panels that make up the end wall 102 may span a single story in height. Any of the sides of the building 100 may include a wall in the form of a window wall 104 that accommodates a window 106, such as window(s) for unit(s). One or more panels that make up the window wall 104 may span a single story in height. Some parts of the building 100 may include an end wall without windows (e.g., not a window wall), such as an end wall 108, which may be comprised of a panel that spans one story of the building 100.

The unit(s) in each story may be formed using either an entire pre-manufactured module or from one or more pre-manufactured floor-ceiling panels and wall panels (not shown in FIG. 1), and the units may also adjoin each other via hallways having pre-manufactured corridor panels as floor-ceiling panels. A floor-ceiling panel may form the floor of a first unit and a ceiling of a second unit below the first unit, and may also be used to form part of the roof of the building 100 when used as the ceiling panel for the top floor. The pre-manufactured wall panels may be used to form interior walls (e.g., demising walls, corridor walls, etc.), window walls (e.g., exterior window wall 104 that accommodate one or more windows 106), utility walls (e.g., walls with utilities such as plumbing and electrical wiring contained therein), side/end walls, etc. According to various embodiments, at least some of these panels may be pre-manufactured off-site such as at a factory, and then installed on site by coupling them together to construct the building 100. The various components of such panels and how such panels are attached to each other will be described later below.

The sides of interior walls that face the interior space (e.g., living space) of the building 100 may be covered by a finish panel, such as wall paneling, for decorative and/or functional purposes. Analogously, the tops and bottoms of floor-ceiling panels that face the interior space (e.g., living space) of the building 100 may also be covered with laminate flooring, finish panels, tile, painted/textured sheathing, etc. for decorative and/or functional purposes. For exterior walls such as end walls, and window walls, the sides of these walls facing the outside environment may be covered with waterproofing membranes, tiles, glass, or other material for decorative and/or functional purposes.

According to various implementations, the building 100 is constructed using load bearing walls (such as demising walls, end walls, etc.). In this manner, such walls are able to support vertical loads, and non-shear walls are able to transfer lateral loads and shear walls are able to transfer and resist lateral loads. Because these walls are load bearing components, the building 100 can eliminate or reduce the use of an extensive steel structural frame in at least some of the levels. For instance, a steel structural frame (e.g., made of an array of beams and columns to which each and every floor-ceiling panel and wall are directly attached) may be absent in levels L2-L6. A steel structural frame may be used in level L1 and/or further structural reinforcement may be given to load bearing walls that are used in level L1 alternatively or in addition to a structural frame, so as to provide structural integrity at ground level.

The building 100, having six levels L1-L6, is defined in some jurisdictions as a mid-rise building (e.g., buildings having six to 12 levels). Buildings having five levels and under are defined in some jurisdictions as a low-rise building. The various embodiments of the load bearing walls described herein may be used in low-rise and mid-rise buildings. Such low-rise and mid-rise buildings may have various fire ratings, with a 2-hour fire rating for mid-rise buildings of six stories or more and a 1-hour fire rating for buildings of five stories or less being examples for some of the buildings that use the load bearing walls described herein.

In some embodiments, the load bearing walls and other building parts described herein (in the absence of a structural frame, or with a reduced amount thereof) may be used for buildings that have a greater number of stories than a typical low-rise or mid-rise building. In such embodiments, the load bearing walls and/or other building parts described herein may be implemented with additional and/or modified structural components, so as to account for the increased load associated with the greater number of stories.

Figure 2:
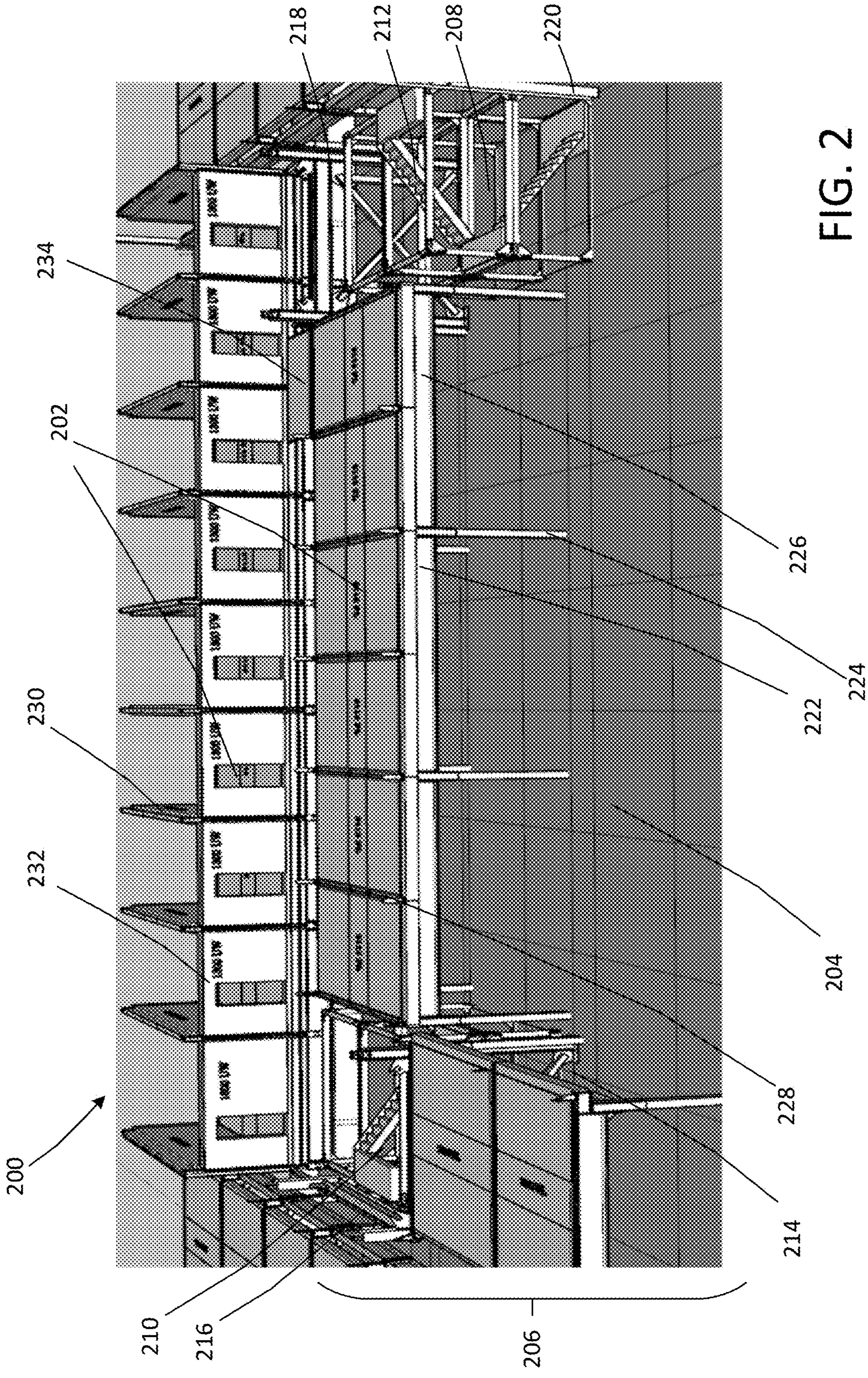
FIG. 2 shows a partially constructed building having floor-ceiling panels at a second floor level of the building, in accordance with some implementations.

FIG. 2 shows a partially constructed building 200 having floor-ceiling panels 202 at a second floor level (L2) of the building, in accordance with some implementations. For purposes of example and illustration, the building 200 will have a generally rectangular footprint, and will be assumed to be a low-rise building having at most five stories (floor levels), and it is understood that the various implementations described herein may be used for buildings with other numbers of stories. A construction sequence described with respect to FIG. 2 and in the other figures that will be shown and described later may be adapted to construct buildings having other shapes, sizes, heights, configurations, number of stories, etc., such as the building 100 of FIG. 1 or any other building where load bearing walls, floor-ceiling panels, and the other building parts described herein are installed in the absence of extensive structural frames on at least some stories. In some embodiments, the various operations in the construction sequence may be performed in a different order, omitted, supplemented with other operations, modified, combined, performed in parallel, etc., relative to what is shown and described with respect to FIG. 2 and the other figures.

To describe a construction sequence to arrive at the partially constructed building 200 in FIG. 2, a foundation 204 is first formed. The foundation 204 may be a steel reinforced concrete slab that is poured on the ground to define a footprint 206 of the building 200, or may be some other type of shallow or deep foundation structure. Furthermore, excavation of the ground may also be performed to form a basement and/or elevator pit(s) 208 that form part of one or more elevator shafts to accommodate one or more elevators.

Next in the construction sequence, pre-manufactured stair and elevator modules 210 and 212 may be built on the foundation 204, and positioned such that the elevator portions of the modules 210 and 212 that will contain the elevator shaft are superimposed over the elevator pit(s) 208. The modules 210 and 212 according to various embodiments may be two stories in height, and there may be one or more of these modules per building, with two modules 210 and 212 shown by way of example in FIG. 2.

Each of the modules 210 and 212 may be comprised of vertical columns made of steel, and horizontal beams spanning between the columns and also made of steel. Thus, the columns and the beams form a structural frame, which according to various embodiments is a load bearing structure that is able to withstand vertical and lateral loads. In other embodiments, the columns may be replaced by load bearing wall panels and the beams may remain as load bearing rings.

The modules 210 and 212 of various embodiments are positioned at specific locations of the foundation 204. In the example of FIG. 2, the modules 210 and 212 are positioned on opposite sides of the building 200. Other configurations may be used, such as positioning one or more modules at a central location in the building footprint 206 or at any other suitable location(s) on the building footprint 206.

Next in the construction sequence, brace members such as braced frames are installed on the foundation 204 in relation to the modules 210 and 212. For example, braced frames 214 and 216 are arranged perpendicularly around and in close proximity to the module 210, such that the module 210 is nested by the braced frames 214 and 216. With respect to the module 212, braced frames 218 and 220 are also arranged perpendicularly but spaced away from the module 212 by a greater distance.

The braced frames 214-220 may be arranged on the foundation 204 in any suitable location and orientation, dependent on factors such as the footprint or configuration of the building 200, source of lateral and/or vertical loads, location/orientation for optimal stabilization, etc. Any suitable number of braced frames may be provided at the ground level. The braced frames may further vary in configuration. The example of FIG. 2 depicts some braced frames that are generally planar in shape (made of two columns and at least one horizontal beam that joins the two columns), with cross beams (X shaped beams) at the center of the braced frames. The braced frames 214-220 may span one, two, or other stories in height or intermediate heights, and multiple braced frames may also be vertically coupled.

According to various embodiments, the modules 210 and 212 are used as erection aids that guide the positioning and orientation of the braced frames 214-220. For instance, the modules 210 and 212 are installed first, and then the braced frames 214-220 are arranged relative to the location of the modules 210 and 212. The braced frames may be directly welded (or otherwise attached/connected) to the modules, or may be linked to the module(s) over a distance via linking beams or other structural framing. The braced frames 214-220 can operate to absorb vertical and lateral loads from the building 200.

The next phase of the construction sequence involves the erection of a steel transfer structure 222 (e.g., a podium structure) at ground level. The steel transfer structure 222 comprises a steel frame that receives and transfers load to the foundation 204. The steel transfer structure 222 may have vertical members 224 (columns) having a height that spans one story, girders 226 that join pairs of columns 224, and beams 228 that perpendicularly join pairs of girders 226. The steel transfer structure 222 may further include vertically oriented "spigots" and/or other protrusions or engagement features to aid in construction, as will be described more fully below.

After completion of the steel transfer structure 222, the next phase of the construction sequence involves the placement/installation of the floor-ceiling panels 202 over consecutive beams 228, and more specifically, hanging the floor-ceiling panels 202 onto the beams 228. A floor deck comprised of floor-ceiling panels 202 thus results after such installation.

Afterwards, load bearing walls 230 (e.g., demising and end walls) are installed by being positioned over the beams 228, and utility walls 232 are then installed by being hung onto the load bearing walls 230. Next, corridor panels 234 (which may be formed similarly in some respects as the floor-ceiling panels 202) are hung from the utility walls 232.

According to the example depicted in FIG. 2, the space between consecutive beams 228 is sized to receive three adjoining floor-ceiling panels 202, although the size of the floor-ceiling panels and the space between consecutive beams 228 and girders 226 can vary from one implementation to another. For instance, some implementations may install multiple floor-ceiling panels between consecutive beams 228 that may vary in widths from 13 feet, to 16 feet, to 20 feet, to 24 feet, etc.

Figure 3:
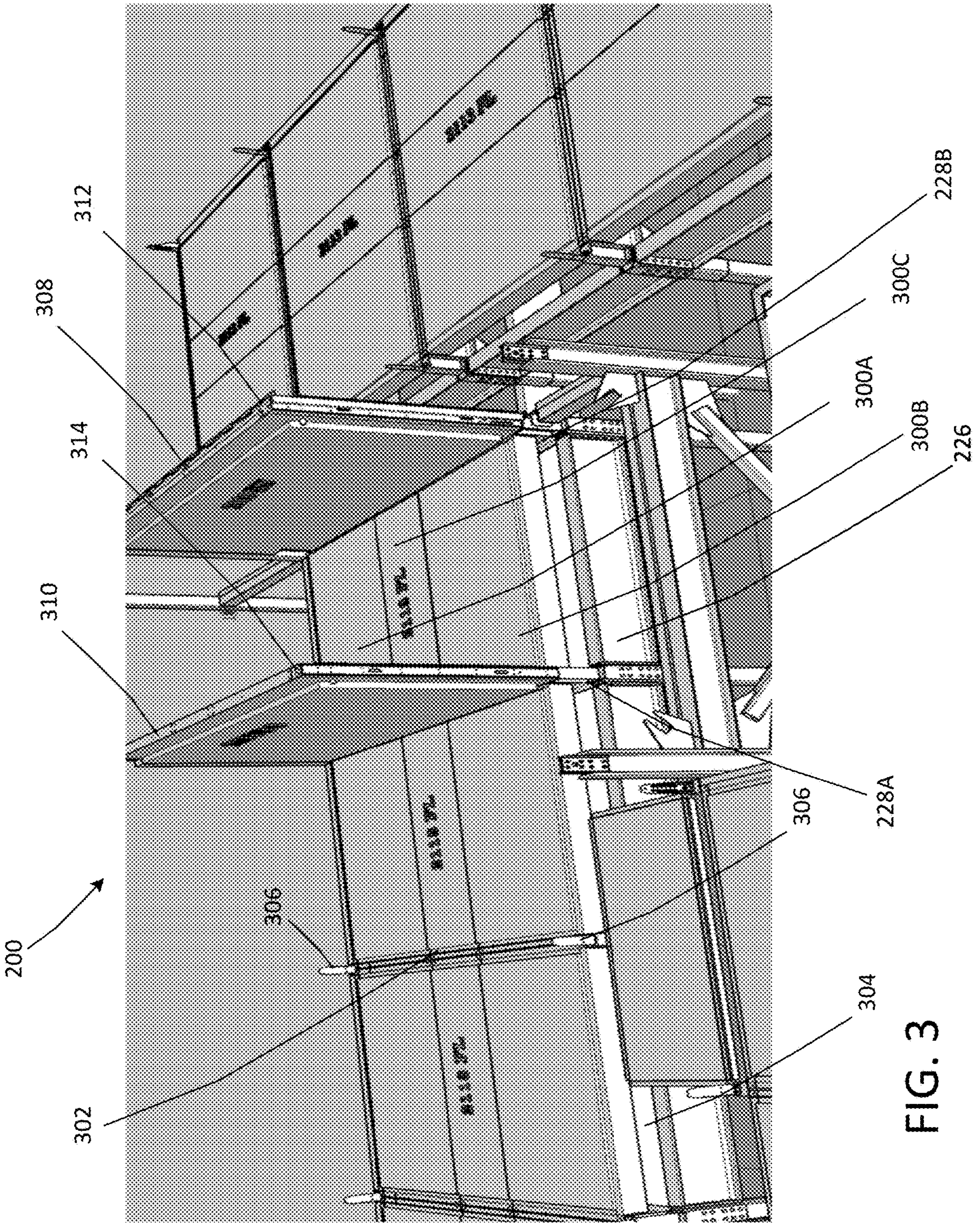
FIG. 3 shows further details of the floor-ceiling panels and load bearing walls of the partially constructed building of FIG. 2, in accordance with some implementations.

FIG. 3 shows further details of the floor-ceiling panels and load bearing walls of the partially constructed building 200 of FIG. 2. More particularly, FIG. 3 depicts the placement of three floor-ceiling panels 300A-300C (collectively 300) over and between consecutive beams 228A and 228B (collectively 228). In the example shown, the floor-ceiling panel 300A is adjacent to a window wall (not yet installed in FIG. 3) that faces an exterior of the building 200, the floor-ceiling panel 300B is adjacent to a utility wall (not yet installed in FIG. 3) that faces an interior corridor of the building 200, and the floor-ceiling panel 300C is a middle panel joined to and between the floor-ceiling panels 300A and 300B.

An installation sequence for the floor-ceiling panels may involve installing the floor-ceiling panel 300A, floor-ceiling panel 300C, and floor-ceiling panel 300B in any suitable sequence, such as floor-ceiling panels 300C-300B-300A. After these three floor-ceiling panels are installed, then the installation sequence moves to the next adjacent space between consecutive beams 228 (e.g., to the left direction in FIG. 3) so as to install the next three floor-ceiling panels in the same manner. This installation sequence repeats until all floor-ceiling panels are installed on the steel transfer structure 224 in the manner as depicted in FIG. 2 to complete a floor deck for that story. Variations in the installation sequence are possible, such as the corridor panels and utility wall could precede the floor-ceiling panels, thereby erecting from the core outwards.

FIG. 3 shows an example mounting of floor-ceiling panels, wherein if the north-south direction along the beam 228 is considered to be a transverse direction, and if the east-west direction along the girder 226 is considered to be the longitudinal direction, then the floor-ceiling panel 300 includes an angle 302 (or other piece of metal that provides ledge-like structure) that runs along its transverse direction along an upper surface (upper corner edge) of the floor-ceiling panel 300. It is understood that the terms transverse and longitudinal are used as relative terms herein, and may be swapped if the building 200 is being viewed or described from a different point of reference.

As will be shown and described in further detail below, the angle 302 includes a horizontal section that rests on a top surface of the beam 228A. A vertical section of the angle 302 is attached to a vertical edge of the floor-ceiling panel 300. A similar angle 302 is attached to the other/opposite transverse edge of the floor-ceiling panel 300, and also has a horizontal section that rests on top of a beam 228B adjacent to that edge of the floor-ceiling panel 300. In this manner, the floor-ceiling panel 300 is hung by its transvers edges between two consecutive beams 228.

With such an arrangement, the floor-ceiling panels provide a horizontal diaphragm that absorbs lateral and/or vertical load(s) and then transfers the load(s), via the angle 302, to the beams 228 of the steel transfer structure 222 and/or to other supporting structure linked to the angles 302. The steel transfer structure 222 then transfers the load(s) via a load path to the foundation 204 and/or to the braced frames (e.g., the braced frames 214-220) via connecting links.

According to some embodiments, the floor-ceiling panels 300 are supported between beams 228 along their transverse sides and are unsupported (e.g., by the girders 226) along their longitudinal sides. In the example of FIG. 3 and as will be explained later below, the floor-ceiling panels 300 may be sized such that there may be a gap 304 between the longitudinal edge of the floor-ceiling panel 300 and the girder 226. This gap 304 may be sized to accommodate the thickness of a utility wall 232 that will be hung from load bearing demising/end walls resting on top of the beams 228, with the gap also providing an opening to enable utilities installed in the utility wall 232 to extend and connect to utilities at the floor level below (and similarly extend/connect to utilities installed in utility wall at a floor level above).

FIG. 3 also depicts alignment/placement and securing of the walls, using spigots 306, in more detail. More particularly, an end wall 308 and a demising wall 310 are installed by positioning these walls over the beams 228. Both of the walls 308 and 310 are load bearing walls. The end wall 308 is also a shear wall (but may not be a shear wall in some situations), and the demising wall 310 may or may not be a shear wall. In general, various structural configurations may be used to enable a wall to be a shear wall so as to resist in-plane shear and overturning. For example, stronger stud configurations or wall material may be used, as well as more dense screw patterns for attaching metal sheets to the walls and augmentation of vertical connections between panels at end studs (tubular members).

In the example of FIG. 3, the end wall 308 may include a tubular member 312, such as a hollow structural section (HSS) tube, along both of its vertical edges. As the end wall 308 is being lowered into position, the spigots 306 (located proximate to both ends of the beam 228), which are alignment and engagement members, are inserted into the openings of the lower ends of the tubular members 312. The end wall 308 is then secured in place by tightening the attachment bolts on the spigot 306 and by affixing a lower edge of the end wall 308 to the upper surface of the floor-ceiling panels, which will be shown and described in further detail below with respect to FIG. 8.

A similar procedure may be used to install the demising wall 310, by fitting openings at lower ends of tubular members 314 at the vertical edges of the demising wall 310 onto the spigots 306. A result of this installation is shown in FIG. 3, wherein two parallel walls are now standing in a self-aligned and self-supported manner, without the need for additional bracing from structural framing (e.g., an internal framing/skeleton of the building 200).

After the floor-ceiling panels, walls, and corridor panels are finished being installed on the second floor level L2, then the construction sequence described with respect to FIGS. 2 and 3 repeats for each subsequent floor level above. For example, FIG. 4 shows installation of a floor-ceiling panel 400 on a next floor level of the building 200, which in this example is the third floor level L3.

Figure 4:
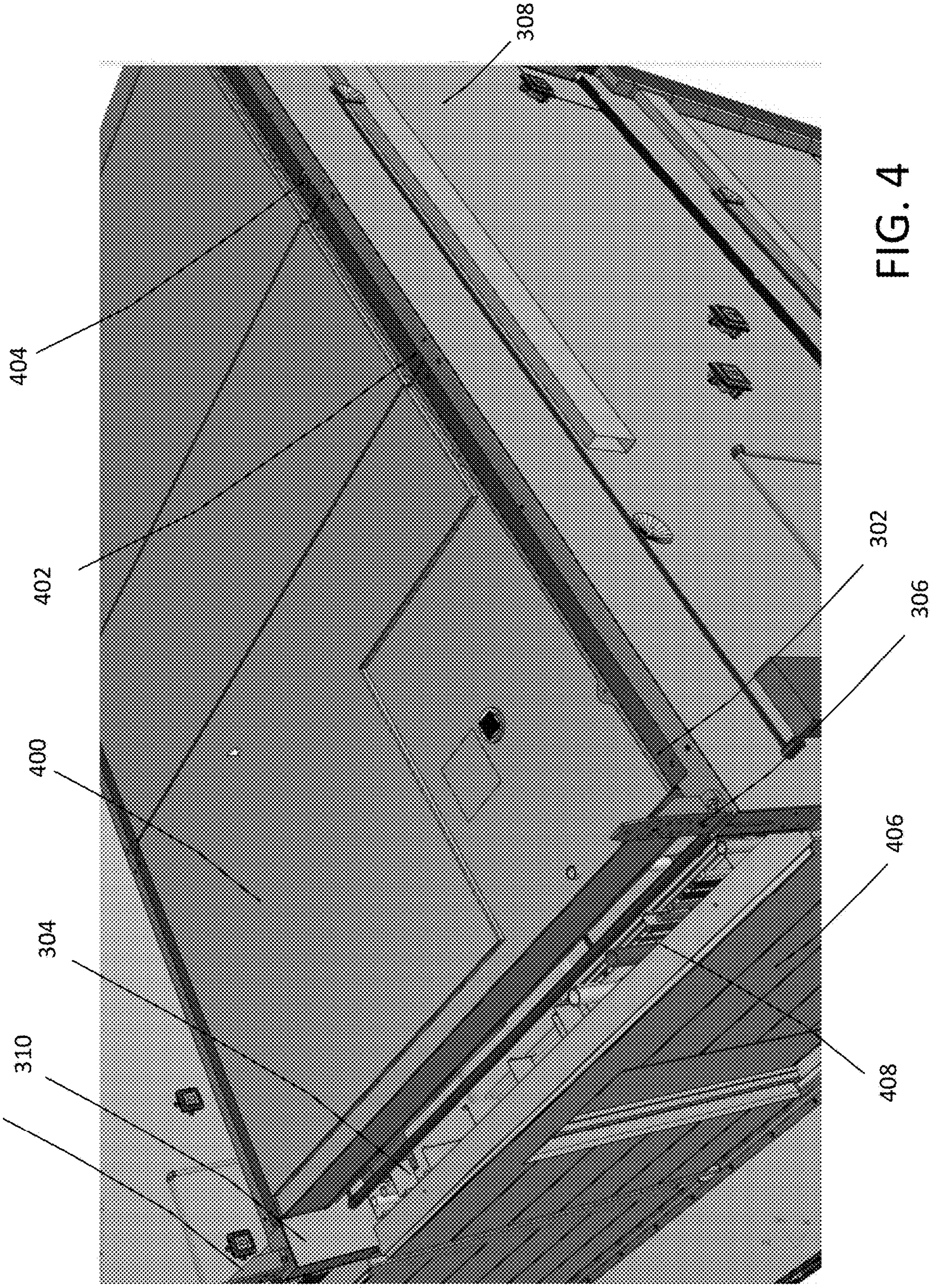
FIG. 4 shows installation of a floor-ceiling panel on a next floor level of the building, in accordance with some implementations.

In FIG. 4, the floor-ceiling panel 400 is hung onto the previously installed end wall 308 and demising wall 310, via the angles 302 that run along the transverse upper edges of the floor-ceiling panel 400. The floor-ceiling panel 400 is hung by resting the horizontal sections of the angles 302 rests on the top surfaces of the end wall 308 and demising wall 310. The manner in which the floor-ceiling panel 400 of FIG. 4 is hung from the top surfaces of the end wall 308 and the demising wall 310, via the angles 302, may be generally similar to the manner that the floor-ceiling panels 300 are hung from the top surfaces of the beams 228 in FIG. 3.

Holes 402 may be formed (e.g., during manufacture at the factory) in the angles 302 of the floor-ceiling panel 400 to facilitate the alignment and positioning of the floor-ceiling panel 400 with some precision. For instance, temporary pegs or screws may be inserted into the holes 402 (which have aligned with corresponding holes of a plate 500 shown in FIG. 5) during installation to align and hold the floor-ceiling panel 400 in place, while the angle 302 is screwed, bolted, or welded to a top plate on the top surfaces of the walls 308 and 310. The holes 402 (with temporary pegs or other holding devices inserted therein and through the corresponding holes in the plate 500) each provide a connection point that holds the floor-ceiling panel 400 in place for precision and safety during building erection. This fastening also creates a tight joint for weld setup, for welding the angle 302 to the plate 500.

Moreover, further spigots 306 may be installed on top of the walls 308 and 310, for alignment and securing of the upper end wall and demising wall that will be installed next on top of the respective lower end wall 308 and demising wall 310. The angle 302 may have cutouts 404 to accommodate fasteners (e.g., bolts) for a mounting base of spigots 306 and/or to accommodate other parts or fasteners.

FIG. 4 also shows an installed utility wall 406 (e.g., the utility wall 232 shown in FIG. 2), with the floor-ceiling panel 400 being sized and installed such that the gap 304 is provided to accommodate a next utility wall above the utility wall 406. The gap 304 may be absent in other embodiments. FIG. 4 further shows that the gap 304 accommodates utilities 408 (e.g., plumbing, electrical, etc.) that are pre-installed in the utility wall 406, and which may be connected to utilities that are pre-installed in the floor-ceiling panel 400, in a manner that will be described later below with respect to FIG. 9, and/or which may be connected to utilities contained in utility walls above/below the utility wall 406.

Figure 5:
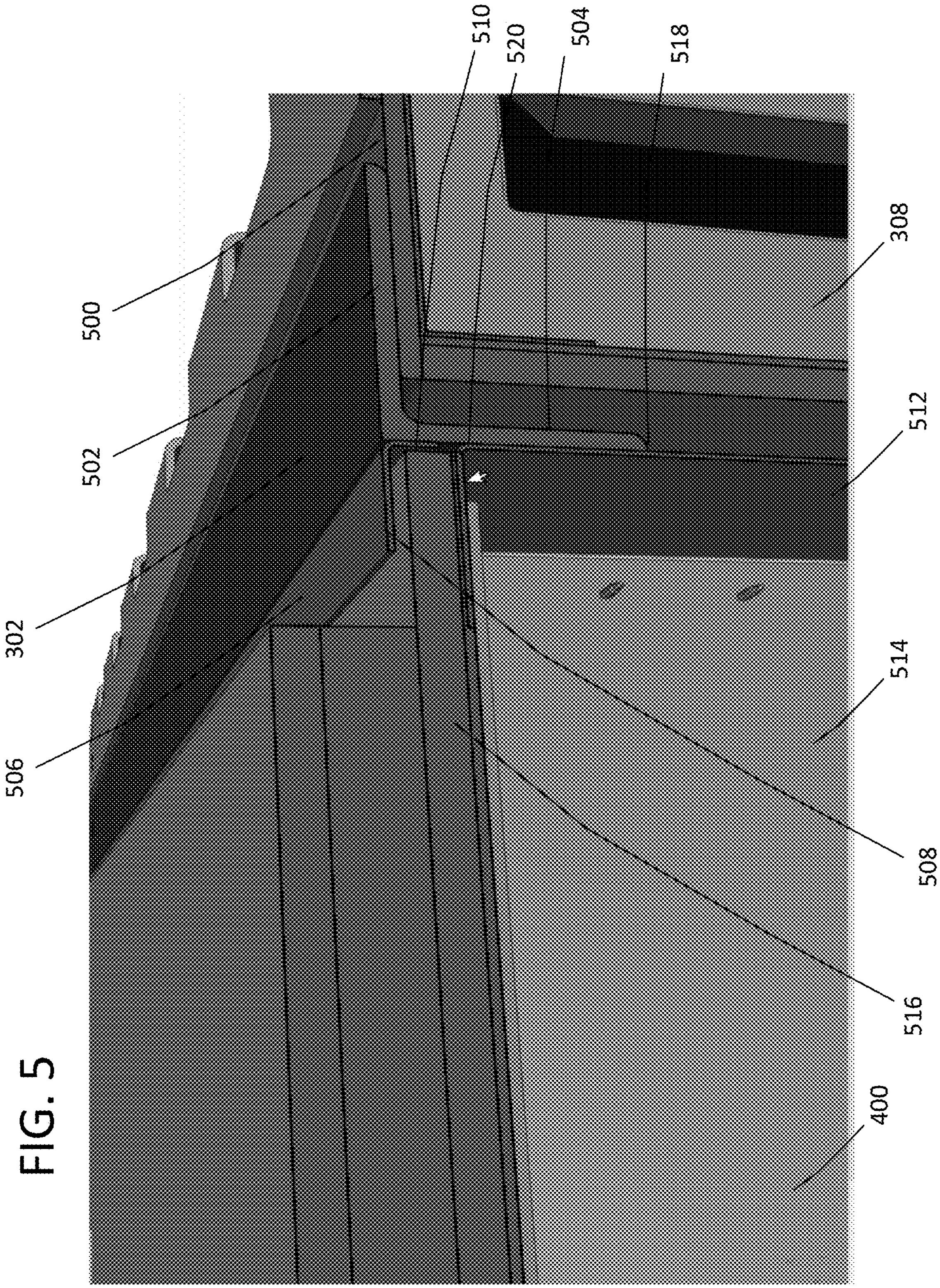
FIG. 5 is a cross-sectional view showing further details of the floor-ceiling panel hung onto a load bearing wall, in accordance with some implementations.

FIG. 5 is a cross-sectional view showing further details of the floor-ceiling panel 400 that is hung onto a load bearing wall (e.g., the end wall 308 or a demising wall). More specifically, FIG. 5 shows the angle 302 (e.g., an L-shaped member such as a hot-rolled metal angle or other type of load carrying/bearing angle) that is positioned over and rests on a plate 500 serving as a head plate at the top of the end wall 308. The angle 302 (first angle) includes a horizontal section (flange) 502 and a vertical section (flange) 504.

The floor-ceiling panel 400 further includes a shear angle 506 (which may be a cold formed metal angle of 14 gauge, for example) that runs along each of the transverse upper edges/corners of the floor-ceiling panel 400. The shear angle 506 (a second angle) has a horizontal section 508 and a vertical section 510.

During offsite manufacturing, the vertical section 510 of the shear angle 506 is welded to the vertical section 504 of the angle 302 (such as via a continuous weld or a stitch weld) at the upper edge (bend) of the vertical section 504, or at upper and lower edges of the vertical section 510. The vertical section 504 of the angle 302 is then welded (such as via a continuous weld or a stitch weld), during the off-site manufacturing, to an end member 512 (such as a track in the form of a C-channel) attached to the ends of longitudinally running parallel metal joists 514 of the floor-ceiling panel 400. The welding may be located at a lower location 518 at the end of the angle 502 and at an upper location 520 at a corner edge of the end member 512.

Welding or otherwise attaching the vertical section 504 of the angle 302 to the floor-ceiling panel 400 enables the angle 302, when hung to the wall 308, to support the vertical load of the floor-ceiling panel 400. The horizontal section 508 of the shear angle 506 in combination with the angle 302 also provides a load path to enable lateral load to be transferred from the diaphragm, formed by the floor-ceiling panel 400, to the plate 500 and then to load path(s) or connecting links to the braced frames, etc.

The horizontal section 508 of the shear angle 506 lies on top of and may or may not be attached to an upper surface of the floor-ceiling panel 400. If attached, screws, bolts, or other type of fastener may be used. If the upper surface of the floor-ceiling panel 400, underneath the horizontal section 508, is made of metal, then welding may be used for attachment, alternatively or additionally to fasteners.

This arrangement of the shear angle 506 and the angle 302 thus forms a T-shaped element that each run transversely along the entire length of the upper corner edges of the floor-ceiling panel 400. While the examples are described herein of the shear angle 506 and the angle 302 (both made of metal such as steel) being separate pieces that are attached to each other, some embodiments may use a single integrated piece of metal that is T-shaped.

Figure 6:
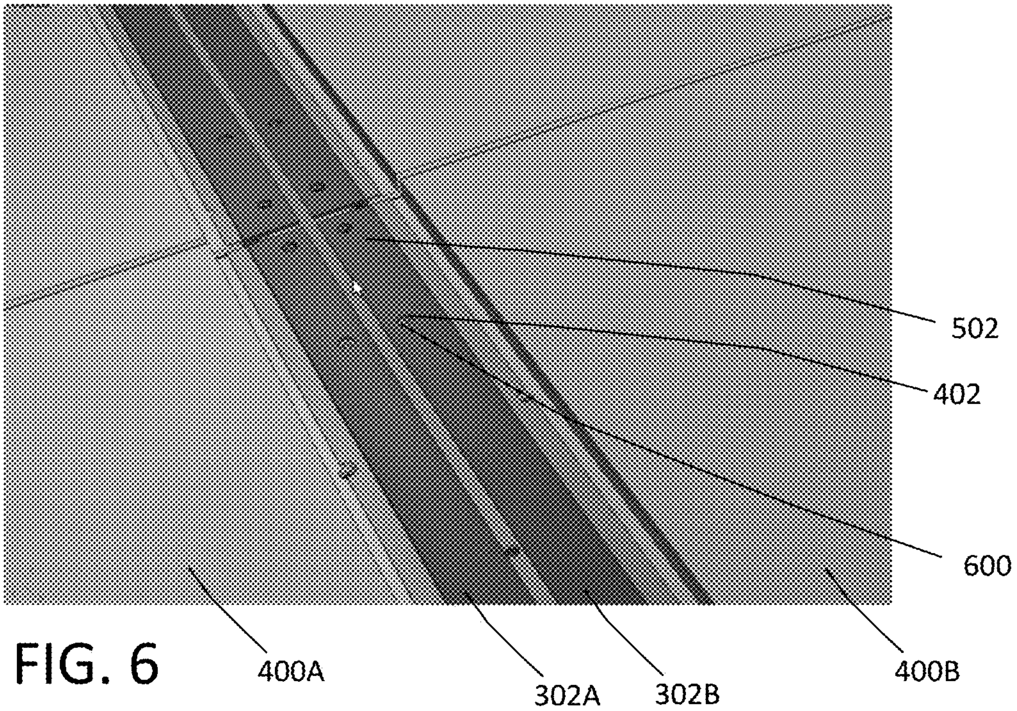
FIGS. 6 and 7 are top views showing further details of angles for floor-ceiling panels, in accordance with some implementations.
Figure 7:
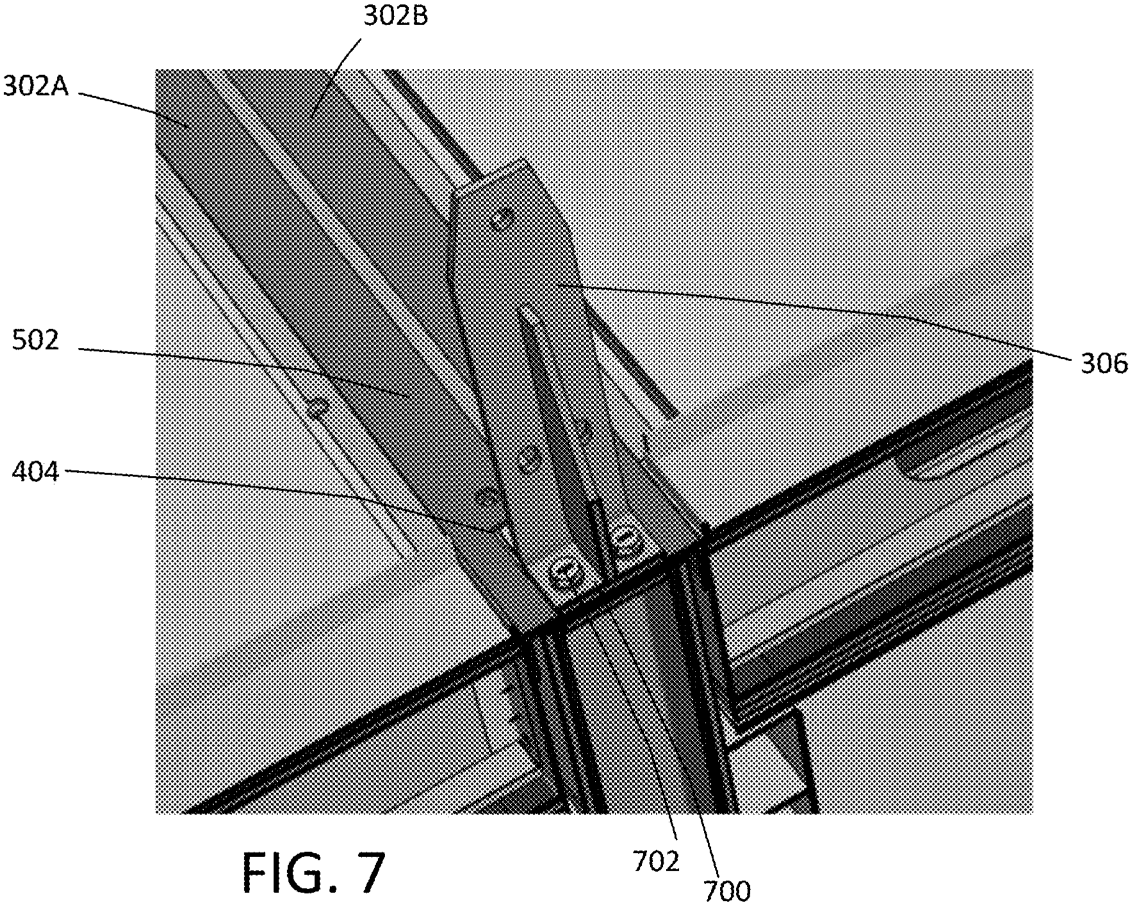

FIGS. 6 and 7 are top views showing further details of angles for floor-ceiling panels, in accordance with some implementations. More specifically, FIG. 6 shows the horizontal sections (flanges) 502 of angles 302A and 302B (collectively 302) of respective adjacent floor-ceiling panels 400A and 400B (collectively 400). A plurality of holes 402 (also shown in FIG. 4) are formed/defined in the horizontal section 502 of the angle 302. The holes 402 are respectively aligned (superimpose with) holes 600 formed/defined in the plate 500 (shown in FIG. 5) at the top surface of the underlying load bearing demising wall or end wall.

During installation of the floor-ceiling panel 400, the holes 402 may be used to align the floor-ceiling panel 400 with the holes 600 of the previously erected demising/end wall. A peg, screw, or other type of holding device may be inserted through the holes 402 and 600 to keep the floor-ceiling 400 aligned/positioned, while the horizontal section 502 is welded permanently to the plate 500. The holding device may then be removed after completing the installation of the floor-ceiling panel 400, so as to not protrude or otherwise interfere with the next demising/end wall that will be placed on top of the horizontal section 502.

In some implementations, the holes 402 may have a larger diameter than the underlying holes 600. Then a holding device (such as a thread forming screw or tapered pin) may be inserted in the holes 402 and 600 as a temporary clamp down mechanism, prior to welding the horizontal section 502 to the plate 500.

In other implementations, a countersunk screw or other type of fastener may be inserted in the holes 402 and 600 as a permanent holding device that will be in turn covered by the next demising/end wall.

FIG. 7 is a cross-sectional view showing an example of the cutouts 404 (shown also in FIG. 4) in the horizontal section 502 of the angles 302A and 302B, such as between floor levels 1 and 2. The cutouts 404 may be sized and shaped to accommodate a mounting base 700 of the spigot 306, and/or to accommodate bolts 702 that are used to attach the spigot 306 to an underlying structural support element (e.g., the plate 500 of the underlying demising/end wall; or an end of an HSS tube shown as a cross-section in FIG. 7 that runs vertically along the end of the underlying demising/end wall; or a beam 228 a girder 226). For example, if spigots 306 have already been installed as vertical protrusions, by being welded or otherwise attached to the steel transfer structure for the first story, the cutouts 404 enable the subsequent floor-ceiling panels to be lowered into position without interference from the spigots 306, since the cutouts 404 will accommodate the spigots 306 as the floor-ceiling panel is lowered. Cutouts may be provided if needed for other stories above, if there are protruding structures that need to be avoided as the floor-ceiling panel is being lowered into position.

Figure 8:
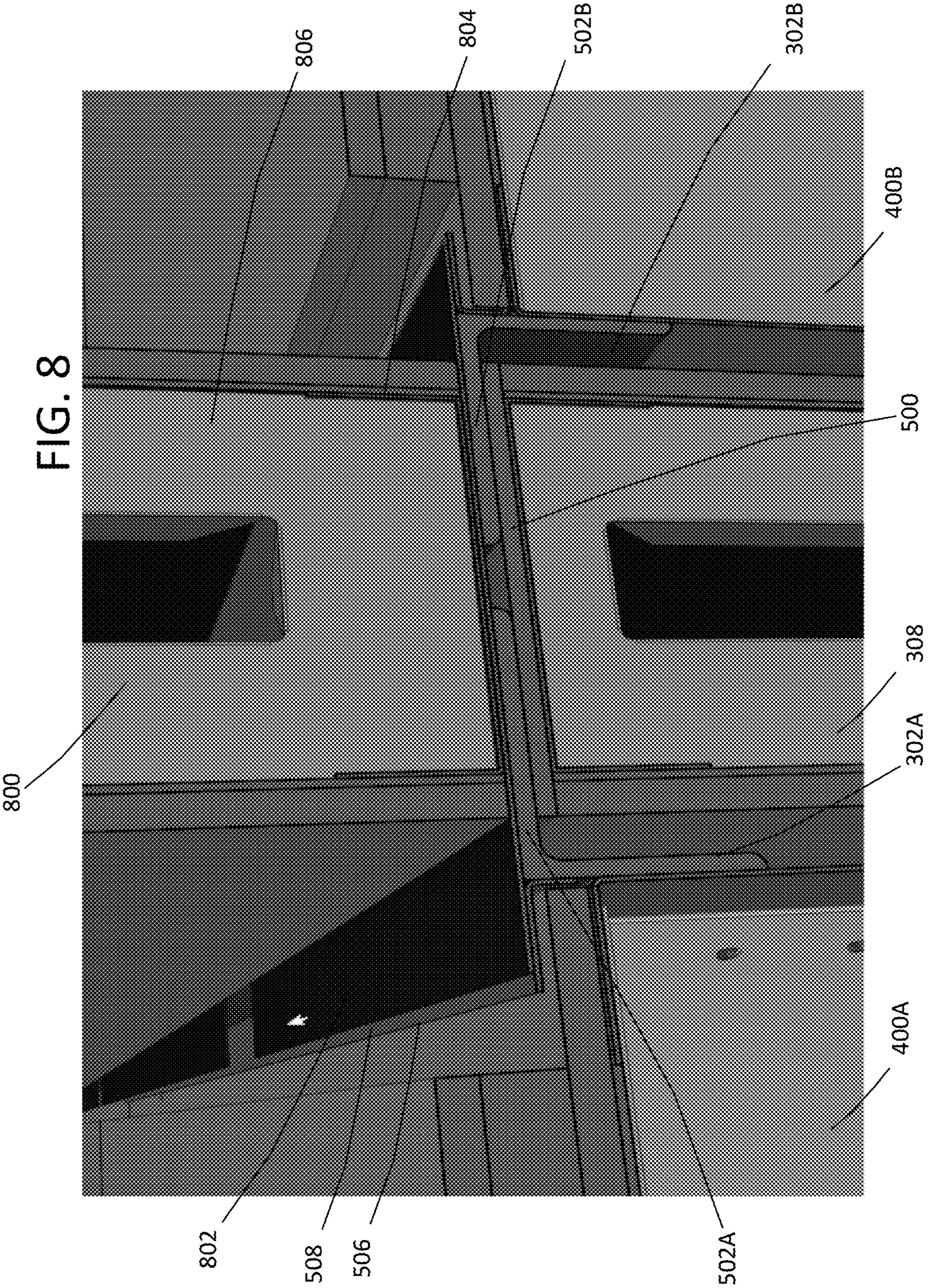
FIG. 8 is a cross-sectional view of an assembly that includes a floor-ceiling panel and two load bearing walls, in accordance with some implementations.

FIG. 8 shows an assembly that includes a floor-ceiling panel and two load bearing walls, in accordance with some implementations. Specifically as an example, a floor-ceiling panel 400A and an adjacent floor-ceiling panel 400B (collectively 400) are depicted in FIG. 8 as being hung onto a load bearing demising wall or end wall (e.g., the end wall 308), via the respective horizontal sections 502A and 502B (collectively 502) of the angles 302A and 302B (collectively 302) of the respective floor-ceiling panels 400A and 400B.

An upper load bearing demising wall or end wall 800 has a horizontal member 802 that is affixed (e.g., by welding, bolting, or screwing), offsite at a factory, to a track 804 joined to lower ends of studs 806 in the wall 800. The horizontal member 802 may run along an entire length of the track 804, or may run intermittently in sections along the track 894, such as depicted in the example of FIG. 8.

During the construction sequence, the wall 800 is lowered aligned/positioned into place (e.g., using the spigots 306 as previously explained above), and then the horizontal member 802 is affixed to the each of the horizontal sections 508 of the shear angles 506 of the floor-ceiling panels 400, thereby permanently mounting the upper load bearing wall 800 over the lower load bearing wall 308. The horizontal section 508 thus forms a landing/fastening location for the horizontal member 802. The horizontal member 802 may be affixed to the shear angle 506 such as by screwing, by stitch or continuous welding the horizontal member 802 to the horizontal section 508, or by bolting or other attachment technique.

Affixing the load bearing upper wall 800 to the floor-ceiling panels 400 in this manner enables lateral load to transfer from the upper wall 800 to the horizontal emember 802, and then to the shear angle 506 and/or the angle 302. The lateral load can then transfer across the diaphragm formed by the floor-ceiling panel 400 (e.g., via the sheets of steel in the floor-ceiling panel 400) and then to linking connections with further load bearing walls (e.g., via other angles 502/506 and plates 500), other floor-ceiling panels, corridor panels, and through various other linking elements and other possible load paths, and then to resisting elements such the braced frames, designated shear walls, etc. For example, in the case that the depicted walls are shear walls, lateral forces may follow the path 800 to 802 to 506/302 to 500, and down to wall 308, thereby transmitting collected lateral force from the diaphragm down the shear wall to the steel transfer structure at ground level and into the foundation. These lateral forces may include forces from non-shear bearing walls that are transmitted into the diaphragm by the same connection detail (as described).

According to various implementations, the horizontal member 802 runs along the entire lower edge of the upper wall 800, and may be made from 14 gauge steel, or ¼ inch steel, or some other steel gauge or thickness. The horizontal member 802 may be 12 inches wide or other dimension.

The plate 500 may be steel that is about 7 inches wide and ¼ inches thick, for example. The angle 302 may be ¼ inch steel, with vertical and horizontal sections of lengths between 2-6 inches, for example. The shear angle 506 may be the same dimensions as the angle 302, or may be made of relatively thinner (or thicker) steel with horizontal/vertical sections that are shorter (or longer) relative to the angle 302.

It is understood that the foregoing various dimensions (as well as for various other components described throughout this disclosure), such as thicknesses, gauges, lengths, widths, heights, etc. are for illustrative purposes, and that such dimensions may vary from one implementation to another depending on factors such as material availability, cost considerations, structural performance requirements (including loading and weight requirements), design variations, etc.

Figure 9:
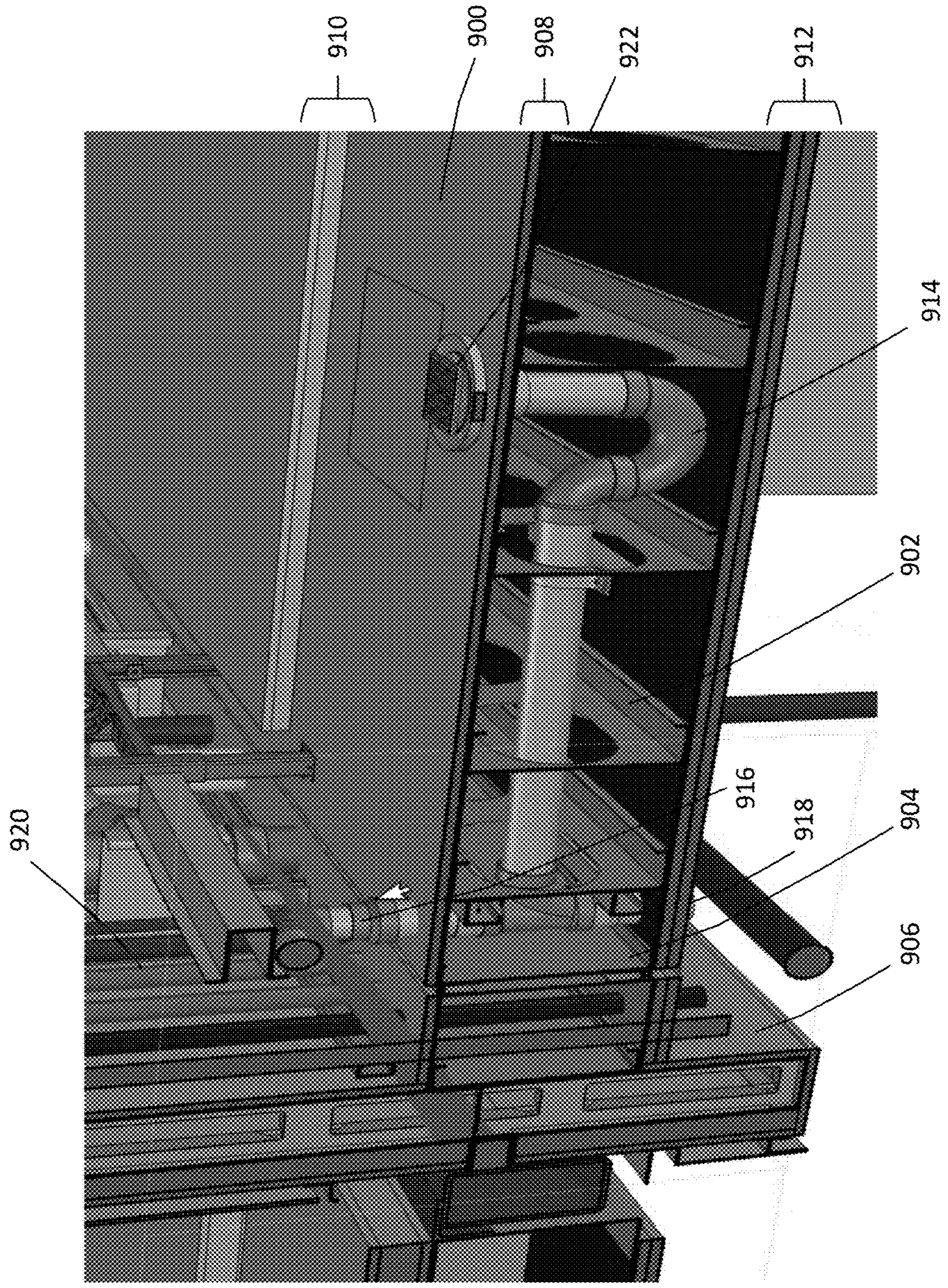
FIG. 9 is a cross-sectional view showing further details of a floor-ceiling panel, in accordance with various implementations.

FIG. 9 is a cross-sectional view showing further details of a floor-ceiling panel 900, which may be similarly configured as the previously described floor-ceiling panels 202, 300, and 400, etc., in accordance with various implementations. The floor-ceiling panel 900 may include a plurality of parallel joists 902, and end members or tracks (shown in FIG. 5) attached to both ends of the joists 902, such that the joists and end members are perpendicular to each other. An outer joist 904 is proximate to a utility wall 906, and a similar outer joist is present on the opposite side of the floor-ceiling panel 900.

On a floor side of the floor-ceiling panel 900, layers 908 may comprise (going from top to bottom) a cement board layer (e.g., a ½" cement board layer, which may be a magnesium oxide layer, that is factory installed) that overlies a first sheet metal layer (e.g., a 22 gauge galvanized steel sheet metal layer that is factory installed) that is positioned against and affixed to the joists 902. Again, it is understood that these and other dimensions identified throughout this disclosure are merely examples, and may vary from one implementation to another.

Layers 910 may overlie the layers 908. The layers 910 may comprise (going from top to bottom) a finished flooring layer (e.g., a ⅜" finished floor that is field finish installed), an acoustical mat layer (e.g., a ⅜" acoustical mat that is field finish installed), a cement board layer (e.g., a ½" cement board layer that is factory installed) that may be magnesium oxide, a hydronic foam layer (e.g., a 1" hydronic foam layer that is factory installed) with hydronic piping within the hydronic foam layer for radiant floor heating purposes.

On a ceiling side of the floor-ceiling panel 900, layers 912 may comprise (going from bottom to top) a ceiling panel layer (e.g., a 1" acoustical ceiling panel tile that is field finish installed), one or more gypsum board layers (e.g., two ⅝" type 'X' fiberglass mat gypsum sheathing boards that are factory installed) for sound proofing and/or fire rating purposes, and a second sheet metal layer (e.g., a 22 gauge galvanized steel sheet metal layer that is factory installed) above the gypsum board layers and positioned against and affixed to the joists 902.

The floor-ceiling panel 900 may also include pre-installed utilities. For example, pipes for plumbing, electrical/telecommunications wiring, etc. may be installed (along with sound proofing insulation) in the space(s) defined by the joists 902. FIG. 9 shows an implementation wherein a drain pipe 914 runs (internally within the floor-ceiling panel 900) through apertures in the joists 902, and exits at 916 from an upper surface of the floor-ceiling panel 900 and exits at 918 from a lower surface of the floor-ceiling panel 900. These exit points enable surface connection of the pipe 914 (or other similarly arranged utilities that are pre-installed in the floor-ceiling panel 900 at a factory) to the utilities 920 that are provided by the utility wall 906 and/or to other utilities, fixtures, devices, etc. contained in the living space, such as a drain 922.

Figure 10:
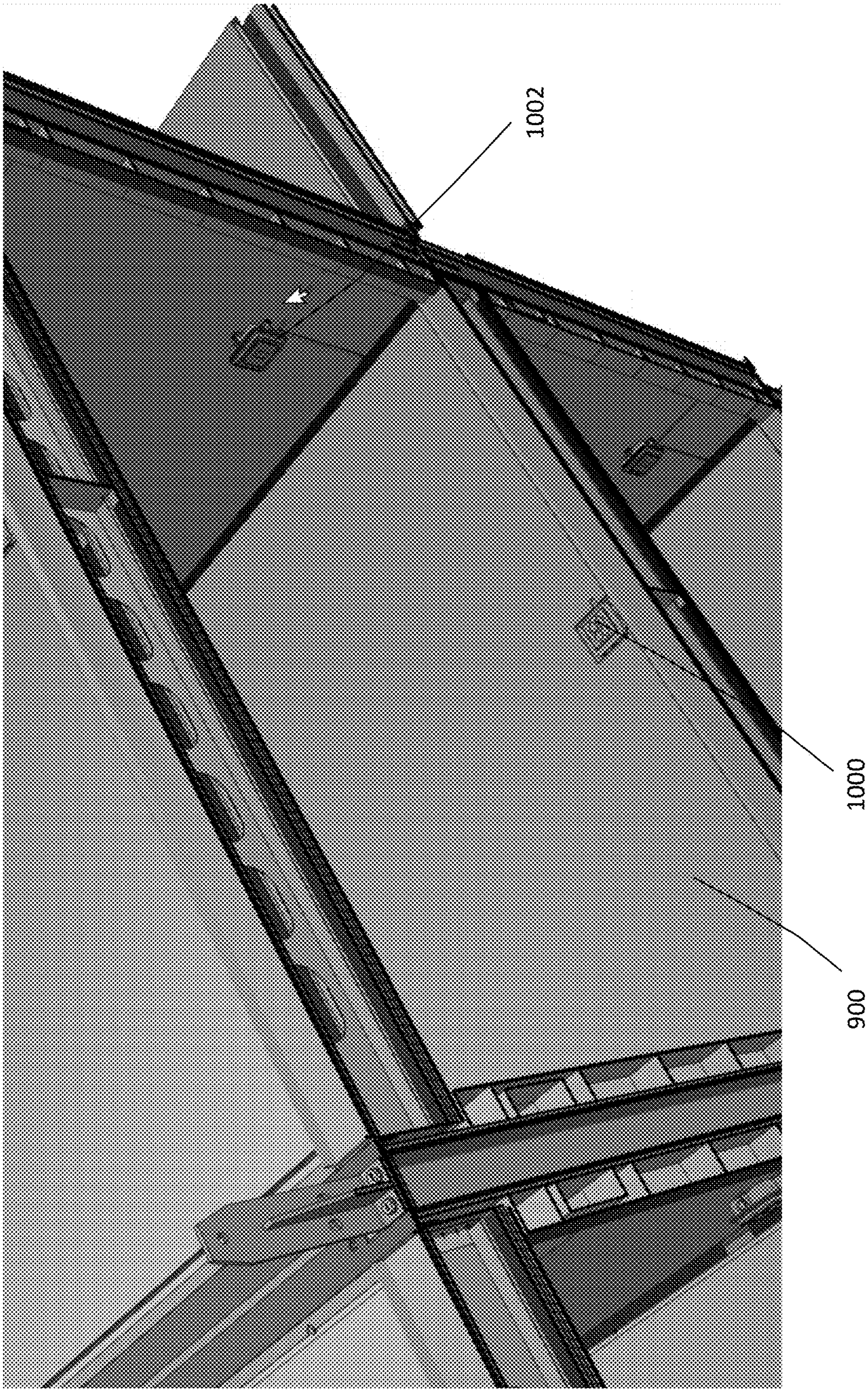
FIG. 10 is a cross-sectional view showing utility boxes of a floor-ceiling panel, in accordance with various implementations.

As a further example, FIG. 10 is a cross-sectional view showing utility boxes, specifically an electrical/telecommunications box or outlet 1000, located on an upper surface of the floor-ceiling panel 900. Wiring for the outlet 1000 may be disposed inside of the floor-ceiling panel 900, such as within the hydronic foam space outside of the joist cavities. Such wiring may further be connected to another outlet 1002 disposed on a wall adjacent to the floor-ceiling panel 900.

Figure 11:
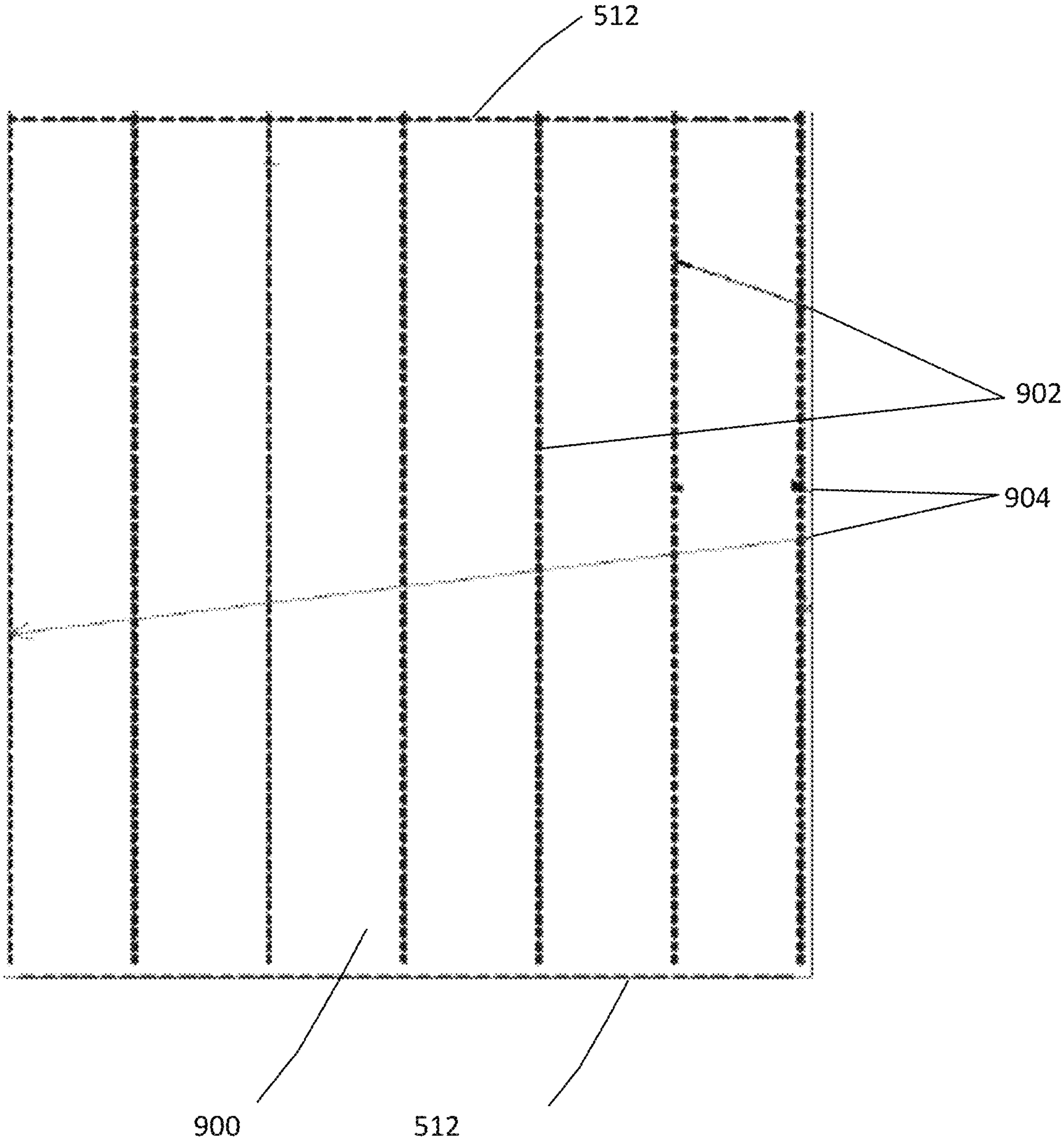
FIG. 11 is a top view showing example screw patterns for a floor-ceiling panel, in accordance with some implementations.

FIG. 11 shows example screw patterns for a floor-ceiling panel (such as the floor-ceiling panel 900 of FIG. 9), in accordance with some implementations. More specifically, FIG. 11 is a top view of the floor-ceiling panel 900, and an analogous view/arrangement may be provided as a bottom view of the floor-ceiling panel 900.

Shown in FIG. 11 are the locations of the previously described joists 902, outer joists 904, and the tracks (end members) 512 at both ends of the joists 902/904. Furthermore, FIG. 11 shows a screw pattern (depicted as broken lines) for both the first and second sheets of metal in the layers 908 and 912 of FIG. 9.

For instance, a sheet of metal may be affixed to the end members 512 and the outer joists 904 (which define the perimeter of the diaphragm) with screws that have relatively closer spacing between them, such as 6 inches on center as opposed to 12 inches on center. Screws that affix this sheet of metal to the joists 902 may be spaced at 12 inches on center, or in some instances at a closer spacing such as 6 inches on center. The relatively closer spacing of 6 inches provides the floor-ceiling panel 900 with increased structural strength to handle and transfer loads.

According to some implementations, the layer 908 (shown in FIG. 9, which is comprised of the first sheet of metal and a cement board layer) on the floor side of the floor-ceiling panel 900 may be attached (e.g., screwed) to the joists 902/904 and end members 512 in tandem, using the same sets of screws. For the layer 912 (also shown in FIG. 9) at the ceiling side of the floor-ceiling panel 900, the second sheet of metal in the layer 912 may be screwed the joists 902/904 and end members 512 using a first set of screws. Then, the two gypsum board layers in the layer 912 may be screwed to the second sheet of metal in the layer 912 using a second set of screws that are offset from the first set of screws and that do not contact the joists 902/904 and end members 512. This method of attachment of the second sheet of metal only to the joists 902/904 and end members 512, and then attachment of the gypsum board layers only to the second sheet of metal, provides improved acoustical performance (e.g., sound proofing by mitigating sound wave transfer).

Thus, with the arrangement and attachment of the sheets of metal and other layers as described above, the floor-ceiling panel 900 provides various advantages. First, the sheets of metal provide additional strength while also enabling the thickness of the floor-ceiling panel to be reduced, thereby resulting in space savings that may permit increased sizes of the living spaces or more living spaces per height of the building 200. Second, the sheets of metal provide improved acoustical performance, such as an acoustical barrier between floor levels. Third, the sheets of metal improve the fire rating between floor levels of the building 200.

The present disclosure is not to be limited in terms of the particular embodiments described in this application, which are intended as illustrations of various aspects. Many modifications and embodiments can be made without departing from its spirit and scope.

Functionally equivalent methods and apparatuses within the scope of the disclosure, in addition to those enumerated herein, are possible from the foregoing descriptions. Such modifications and embodiments are intended to fall within the scope of the appended claims. The present disclosure is to be limited only by the terms of the appended claims, along with the full scope of equivalents to which such claims are entitled. This disclosure is not limited to particular methods, which can, of course, vary. The terminology used herein is for the purpose of describing particular embodiments only, and is not intended to be limiting.

With respect to the use of substantially any plural and/or singular terms herein, the terms can be translated from the plural to the singular and/or from the singular to the plural as is appropriate to the context and/or application. The various singular/plural permutations may be expressly set forth herein for sake of clarity.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

If a specific number of an introduced claim recitation is intended, such an intent will be explicitly recited in the claim, and in the absence of such recitation, no such intent is present. For example, as an aid to understanding, the following appended claims may contain usage of the introductory phrases “at least one” and “one or more” to introduce claim recitations. However, the use of such phrases should not be construed to imply that the introduction of a claim recitation by the indefinite articles “a” or “an” limits any particular claim containing such introduced claim recitation to embodiments containing only one such recitation, even when the same claim includes the introductory phrases “one or more” or “at least one” and indefinite articles such as “a” or “an” (e.g., “a” and/or “an” should be interpreted to mean “at least one” or “one or more”); the same holds true for the use of definite articles used to introduce claim recitations. In addition, even if a specific number of an introduced claim recitation is explicitly recited, such recitation should be interpreted to mean at least the recited number (e.g., the bare recitation of “two recitations,” without other modifiers, means at least two recitations, or two or more recitations).

Furthermore, in those instances where a convention analogous to “at least one of A, B, and C, etc.” is used, in general such a construction is intended in the sense one having skill in the art would understand the convention (e.g., “a system having at least one of A, B, and C” would include but not be limited to systems that have A alone, B alone, C alone, A and B together, A and C together, B and C together, and/or A, B, and C together, etc.). In those instances where a convention analogous to “at least one of A, B, or C, etc.” is used, in general such a construction is intended in the sense one having skill in the art would understand the convention (e.g., “a system having at least one of A, B, or C” would include but not be limited to systems that have A alone, B alone, C alone, A and B together, A and C together, B and C together, and/or A, B, and C together, etc.). Virtually any disjunctive word and/or phrase presenting two or more alternative terms, whether in the description, claims, or drawings, should be understood to contemplate the possibilities of including one of the terms, either of the terms, or both terms. For example, the phrase “A or B” will be understood to include the possibilities of “A” or “B” or “A and B.”

In addition, where features or aspects of the disclosure are described in terms of Markush groups, the disclosure is also thereby described in terms of any individual member or subgroup of members of the Markush group.

For any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. All language such as “up to,” “at least,” “greater than,” “less than,” and the like include the number recited and refer to ranges which can be subsequently broken down into subranges as discussed above. Finally, a range includes each individual member. Thus, for example, a group having 1-3 items refers to groups having 1, 2, or 3 items. Similarly, a group having 1-5 items refers to groups having 1, 2, 3, 4, or 5 items, and so forth.

The herein described subject matter sometimes illustrates different components contained within, or connected with, different other components. Such depicted architectures are merely embodiments, and in fact many other architectures can be implemented which achieve the same functionality. In a conceptual sense, any arrangement of components to achieve the same functionality is effectively “associated” such that the desired functionality is achieved. Hence, any two components herein combined to achieve a particular functionality can be seen as “associated with” each other such that the desired functionality is achieved, irrespective of architectures or intermedial components. Likewise, any two components so associated can also be viewed as being “operably connected”, or “operably coupled”, to each other to achieve the desired functionality, and any two components capable of being so associated can also be viewed as being “operably couplable”, to each other to achieve the desired functionality. Specific embodiments of operably couplable include but are not limited to physically mateable and/or physically interacting components.

While various aspects and embodiments have been disclosed herein, other aspects and embodiments are possible. The various aspects and embodiments disclosed herein are for purposes of illustration and are not intended to be limiting.

What is claimed is:

1. A pre-manufactured floor-ceiling panel for a multi-story building having load bearing walls, the floor-ceiling panel comprising:
- a plurality of parallel metal joists;
- an end member affixed to an end of the joists;
- a first angle having a horizontal section and a vertical section, wherein the horizontal section of the first angle is configured to be placed on top of a plate of a load bearing wall of the building, and wherein the vertical section of the first angle is affixed to the end member;
- a second angle having a horizontal section and a vertical section, wherein the horizontal section of the second angle forms a fastening location for a horizontal member of the load bearing wall, and wherein the vertical section of the second angle is affixed to the vertical section of the first angle,
- wherein the horizontal section of the first angle is formed with first holes for alignment with second holes formed in the plate of the load bearing wall.

2. The pre-manufactured floor-ceiling panel of claim 1, wherein:
- the first angle runs along an entire length of the end member,
- the vertical section of the first angle is welded to the end member along the entire length of the end member,
- the second angle runs along the entire length of the end member, and
- the vertical section of the second angle is welded to the vertical section of the first angle along the entire length of the end member.

3. The pre-manufactured floor-ceiling panel of claim 1, wherein the first holes are sized and shaped to receive temporary devices inserted into the first and holes and the second holes, and wherein the temporary holding devices hold the first angle in alignment with the plate of the load bearing wall while the horizontal section of the first angle is affixed to the plate during installation and the temporary holding devices are removed thereafter.

4. The pre-manufactured floor-ceiling panel of claim 1, wherein the horizontal section of the first angle is formed with at least one cutout that is sized and shaped to accommodate a spigot attached to the load bearing wall.

5. The pre-manufactured floor-ceiling panel of claim 1, wherein the horizontal section of the second angle is affixed with screws to the horizontal member of the load bearing wall.

6. The pre-manufactured floor-ceiling panel of claim 1, further comprising:

a first sheet of metal affixed, on a first side of the floor-ceiling panel, to the joists and the end member;

a second sheet of metal affixed, on a second side of the floor-ceiling panel, to the joists and the end member, wherein the first and second sheets of metal provide structural strength, sound proofing, and increased fire rating for the pre-manufactured floor-ceiling panel.

7. The pre-manufactured floor-ceiling panel of claim 6, wherein:

the first and second sheets of metal are affixed to the joists and the end members with closely spaced screws to increase the structural strength of the pre-manufactured floor-ceiling panel, wherein interconnection of the first and second sheets of metal, the joists, and the end members define a horizontal diaphragm configured to transmit or receive loads of the building, and the screws are spaced at about 6 inches apart.

8. The pre-manufactured floor-ceiling panel of claim 6, further comprising:

a cement board layer that overlies the first sheet of metal;

two gypsum board layers that underlie the second sheet of metal;

a first set of screws that affix the cement board layer and the first sheet of metal to the joists and end members in tandem;

a second set of screws that affix the second sheet of metal to the joists and end members in tandem; and a third set of screws, offset from the first set of screws, that affix the two gypsum board layers to the second sheet of metal.

9. The pre-manufactured floor-ceiling panel of claim 8, wherein the horizontal member of the second angle overlies the cement board layer.

10. The pre-manufactured floor-ceiling panel of claim 1, wherein the building is a low-rise building or a mid-rise building.

11. The pre-manufactured floor-ceiling panel of claim 1, further comprising utilities that run within spaces defined by the joists and that exit at a floor side and at a ceiling side of the pre-manufactured floor-ceiling panel for surface connection with other utilities.

12. The pre-manufactured floor-ceiling panel of claim 1, wherein the pre-manufactured floor ceiling panel forms a horizontal diaphragm that provides a load path for shear load, and wherein the shear load passes from the load bearing wall, then to the horizontal member, then to the second angle, then across the diaphragm, and then to a linking connection to a structural element of the building.

13. A multi-story building, comprising:

a stair and elevator module at a ground level of the building;

brace members that are guided into position by the stair and elevator module;

a steel transfer structure that is linked to the brace members, wherein the steel transfer structure includes vertical columns and horizontal beams;

pre-manufactured first floor-ceiling panels that are hung from the beams;

pre-manufactured first load bearing walls positioned on top of the beams;

pre-manufactured utility walls that are hung from the first load bearing walls;

corridor panels that are hung from the utility walls; and pre-manufactured second floor-ceiling panels that are hung from the first load bearing walls, wherein each of the pre-manufactured second floor-ceiling panels include:

a plurality of parallel metal joists;

an end member affixed to an end of the joists;

a first angle having a horizontal section and a vertical section, wherein the horizontal section of the first angle is configured to be placed on top of a plate of a particular first load bearing wall of the building, and wherein the vertical section of the first angle is affixed to the end member;

a second angle having a horizontal section and a vertical section, wherein the horizontal section of the second angle forms a fastening location for a horizontal member of the particular first load bearing wall, and wherein the vertical section of the second angle is affixed to the vertical section of the first angle, wherein the horizontal section of the first angle is formed with first holes for alignment with second holes formed in the plate of the particular first load bearing wall.

14. The building of claim 13, further comprising a spigot installed at an end of the particular first load bearing wall, wherein the horizontal section of the first angle is formed with at least one cutout that is sized and shaped to accommodate the spigot.

15. The building of claim 13, wherein the building is a low-rise building having five or less stories.

16. The building of claim 13, wherein the first holes are sized and shaped to receive temporary devices inserted into the first and holes and the second holes, and wherein the temporary holding devices hold the first angle in alignment with the plate of the particular first load bearing wall while the horizontal section of the first angle is affixed to the plate during installation and the temporary holding devices are removed thereafter.

17. The building of claim 13, wherein each of the pre-manufactured second floor-ceiling panels include:

a first sheet of metal affixed, on a first side of each of the pre-manufactured second floor-ceiling panels, to the joists and the end member;

a second sheet of metal affixed, on a second side of each of the pre-manufactured second floor-ceiling panels, to the joists and the end member, wherein the first and second sheets of metal provide structural strength, sound proofing, and increased fire rating for the pre-manufactured floor-ceiling panel, and wherein the first and second sheets of metal are affixed to the joists and end members with screws, including at least some closely spaced screws to increase the structural strength of the pre-manufactured second floor-ceiling panel.

18. The building of claim 17, wherein each of the pre-manufactured second floor-ceiling panels include:

a cement board layer that overlies the first sheet of metal;

two gypsum board layers that underlie the second sheet of metal, and wherein the screws include:

a first set of screws that affix the cement board layer and the first sheet of metal to the joists and end members in tandem;

a second set of screws that affix the second sheet of metal to the joists and end members in tandem; and a third set of screws, offset from the first set of screws, that affix the two gypsum board layers to the second sheet of metal.

19. The building of claim 13, wherein the pre-manufactured second floor ceiling panel forms a horizontal diaphragm that provides a load path for shear load, and wherein the shear load passes from the first load bearing walls, then to the horizontal member, then to the second angle, then across the diaphragm, and then to a linking connection to a structural element of the building.

20. A method to manufacture a floor-ceiling panel for a multi-story building that includes load bearing walls, the method comprising:

arranging a plurality of metal joists in parallel;

affixing an end member to ends of the joists;

affixing a first angle and a second angle to each other, wherein:

the first angle has a horizontal section and a vertical section, wherein the horizontal section of the first angle is configured to be placed on top of a plate of a load bearing wall of the building, the second angle has a horizontal section and a vertical section, wherein the horizontal section of the second angle forms a fastening location for a horizontal member of the load bearing wall, and the first angle and the second angle are affixed to each other by affixing the vertical section of the second angle to the vertical section of the first angle;

affixing the vertical section of the first angle to the end member;

forming first holes in the horizontal section of a first angle for alignment with second holes formed in the plate of the load bearing wall; and forming at least one cutout in the horizontal section of the first angle to accommodate a spigot attached to the load bearing wall.

* * * * *